United States Patent [19]
Solomon et al.

[11] Patent Number: 5,815,583
[45] Date of Patent: Sep. 29, 1998

[54] AUDIO SERIAL DIGITAL INTERCONNECT

[75] Inventors: Gary A. Solomon, Hillsboro; Russ K. Hampsten, Beaverton, both of Oreg.

[73] Assignee: Intel Corporation, Santa Clara, Calif.

[21] Appl. No.: 673,282

[22] Filed: Jun. 28, 1996

[51] Int. Cl.$^6$ .................................................. H04B 3/00
[52] U.S. Cl. ........................... 381/77; 370/450; 370/451; 370/454; 370/538
[58] Field of Search .............................. 381/77; 370/450, 370/451, 454, 538, 543

[56] References Cited

U.S. PATENT DOCUMENTS

| | | | |
|---|---|---|---|
| 5,532,556 | 7/1996 | Anderson et al. | 375/356 |
| 5,539,660 | 7/1996 | Blair et al. | 370/53 |
| 5,603,012 | 2/1997 | Sotheran | 395/500 |

OTHER PUBLICATIONS

William Stallings, Data and Computer Communications, 1994, pp. 134–143 and 189–195.

*Primary Examiner*—Forester W. Isen
*Attorney, Agent, or Firm*—Blakely, Sokoloff, Taylor & Zafman

[57] ABSTRACT

A method for communicating information from a first integrated circuit (IC) to a second IC. A sync signal is transmitted between the two IC's to indicate the start of a transmission of a frame of information from the first IC to the second IC. In this case, a frame of information includes a tag slot and a plurality of data slots. The tag slot contains a series of tag bits wherein each tag bit is associated with a data slot. The value of each tag bit indicates whether its corresponding data slot contains valid or invalid data. The first IC sends the tag slot and data slots to the second IC.

21 Claims, 4 Drawing Sheets

AUDIO SERIAL DIGITAL INTERCONNECT

FIELD OF THE INVENTION

The present invention relates to communication across a bus between two integrated circuits, and more particularly to a method for sending digital audio information from a first integrated circuit to a second integrated circuit.

BACKGROUND OF THE INVENTION

Sounds can be recorded and manipulated by electronic systems by first converting sound waves into corresponding electrical impulses, then using electronic circuitry to store or modify these impulses. After modification and/or storage, the electrical impulses are converted back into sound waves. For example, in a basic, analog amplification system, a microphone converts sound waves (air compression waves) into voltage signals whereby the louder the sound the greater the voltage and the greater the sound wave frequency the greater the voltage frequency. This audio signal, which now corresponds to the original sound wave, is then run through circuitry to increase the voltage amplitude. Finally, this amplified audio voltage signal (or its associated current signal) is fed into a speaker which reconverts the audio signal back into sound waves which are louder than the original sound waves picked up by the microphone.

In the analog circuitry used in the amplifier example described above, the amplitude and frequency of the audio signals manipulated by the circuitry is directly related to the amplitude and frequency of its corresponding sound wave. One problem with modifying audio signals using analog circuitry is that a significant amount of noise tends to be added to the signal by inherent non-linearity of the transistors and other electronic components in the circuit.

In contrast, digital audio signals are represented by discrete digital samples of the analog audio signal, creating a stream of individual numbers which effectively "describe" the audio signal. Digital audio signals are modified using digital circuitry, the advantage of which is that non-linearity of the transistors in the circuit will not introduce noise to the audio signal because the transistors are not operated in their linear region. Instead, the sound quality of digitally manipulated audio signals is more a function of the sampling frequency and the maximum value (or bit length or resolution) of the audio signal samples. In addition, dealing with digital rather than analog audio signals can be advantageous because digital audio signals are compatible with digital electronic systems such as, for example, personal computers, thereby allowing a user to apply the advanced interfaces and processing power of these devices to audio signal processing.

FIG. 1 shows a computer system comprising a processor 101 coupled to bus 100. Peripheral devices communicate with processor 101 through bus 100. The peripheral devices shown coupled to bus 100 include video interface 102 for capturing video images, audio interface 103, memory 104 for storing data, and network 105 through which the computer system communicates with other computer systems. Audio interface 103 is coupled to microphone 106, compact disk (CD) player 107, modem 108, and speaker 109.

Audio interface 103 comprises an integrated circuit (IC) which contains a significant amount of both analog and digital circuitry. Audio interface 103 communicates with processor 101, along with the other peripheral components, via bus 100 using a standard bus protocol such as, for example, the Peripheral Component Interconnect (PCI) bus protocol. As such, audio interface 103 must contain the digital circuitry necessary to support bus mastering and slave operation in accordance with PCI bus protocol, as well as the digital circuitry necessary to control analog circuit functions and to perform digital signal processing.

In addition to the digital circuitry, audio interface 103 comprises the analog circuitry necessary to support analog audio signal exchange with microphone 106, CD player 107, modem 108, and speaker 109, as well as any analog signal processing circuitry to support, for example, analog mixing, amplification, and filtering. As stated above, analog circuitry can add a significant amount of noise to an audio signal due to inherent limitations of the circuit components themselves when operated in their linear range. Because of this, special care must be taken and special materials are used to fabricate the analog circuitry of audio interface 103 so that the circuit components are of high quality and contribute as little noise as possible to the analog audio signal.

Because audio interface 103 comprises a significant amount of both analog and digital circuitry on a single IC, the special fabrication process used to manufacture the analog circuitry of the device is also used to manufacture the digital circuitry of the device. As stated above, digital audio signal noise is more a function of sampling frequency and bit length rather than digital circuit component quality. Therefore, expensive fabrication costs associated with creating high quality analog circuitry for audio interface 103 is effectively wasted on the digital circuitry of the device, thereby increasing the cost of the overall device and significantly limiting the size, complexity, and device density of the digital circuitry.

SUMMARY AND OBJECTS OF THE INVENTION

An object of the invention is to provide a high quality interface for a computer system.

Another object of the invention is to provide a method for communicating information between two integrated circuits.

A method is described for communicating information from a first integrated circuit (IC) to a second IC. A sync signal is transmitted between the two IC's to indicate the start of a transmission of a frame of information from the first IC to the second IC. In this case, a frame of information includes a tag slot and a plurality of data slots. The tag slot contains a series of tag bits wherein each tag bit is associated with a data slot. The value of each tag bit indicates whether its corresponding data slot contains valid or invalid data. The first IC sends the tag slot and data slots to the second IC.

Other features and advantages of the present invention will be apparent from the accompanying drawings and the detailed description that follows.

BRIEF DESCRIPTION OF THE DRAWINGS

The present invention is illustrated by way of example and not limitation in the figures of the accompanying drawings in which like references indicate similar elements and in which.

DETAILED DESCRIPTION

A method is described for communicating information from a first integrated circuit (IC) to a second IC thereby enabling, for example, an audio interface to be split between a first IC comprising primarily the digital circuitry of the audio interface and a second IC comprising primarily the analog circuitry of the audio interface. The first IC then sends audio information to the second IC via a first interconnect line while the second IC sends audio information to the first IC via a second interconnect line. In this manner, the second IC, called an analog audio interface, which is coupled to external peripheral devices such as speakers and microphones, can be specially manufactured using a fabrication process suited for low-noise analog circuitry at relatively low cost. The first IC, called a digital audio interface, which is coupled to a host processing unit via a bus, can similarly be specially manufactured using a fabrication process suited for fast, high density digital circuitry at relatively low cost. Ultimately, the sound quality and economics of the overall audio interface are improved.

The interconnection between the digital audio interface and the analog audio interface primarily comprises two serial digital interconnects which transmit frames of audio information at a rate of approximately 48 KHz. Each frame of audio information comprises a tag slot 16 bits wide and 12 data slots, each 20 bits wide. A single data slot may contain an audio sample of up to 20 bits in length, thereby providing audio signal resolution sufficiently broad to cover the entire audio spectrum. This basic interconnect protocol can be used to communicate not only frames of audio information but also frames of other types of information as well.

The overall audio interface architecture will first be described in more detail below to provide a broad overview as to how this new interface fits into a basic computer system. Then, a more detailed discussion of the audio serial digital interconnect communication protocol between the analog and the digital portions of the audio interface will follow.

Figure 1:
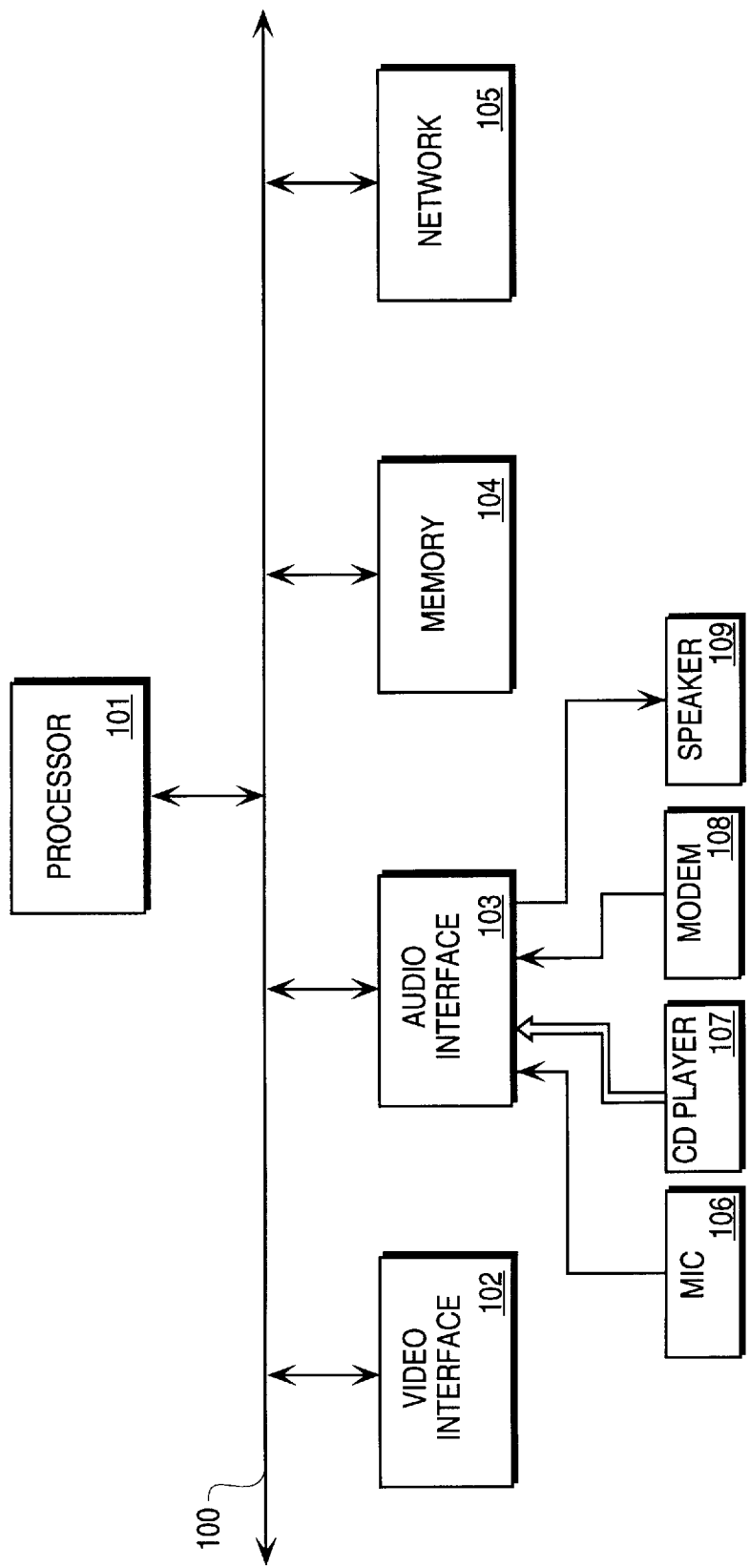
FIG. 1 is a block diagram of a computer system which shows a prior art audio interface.
Figure 2:
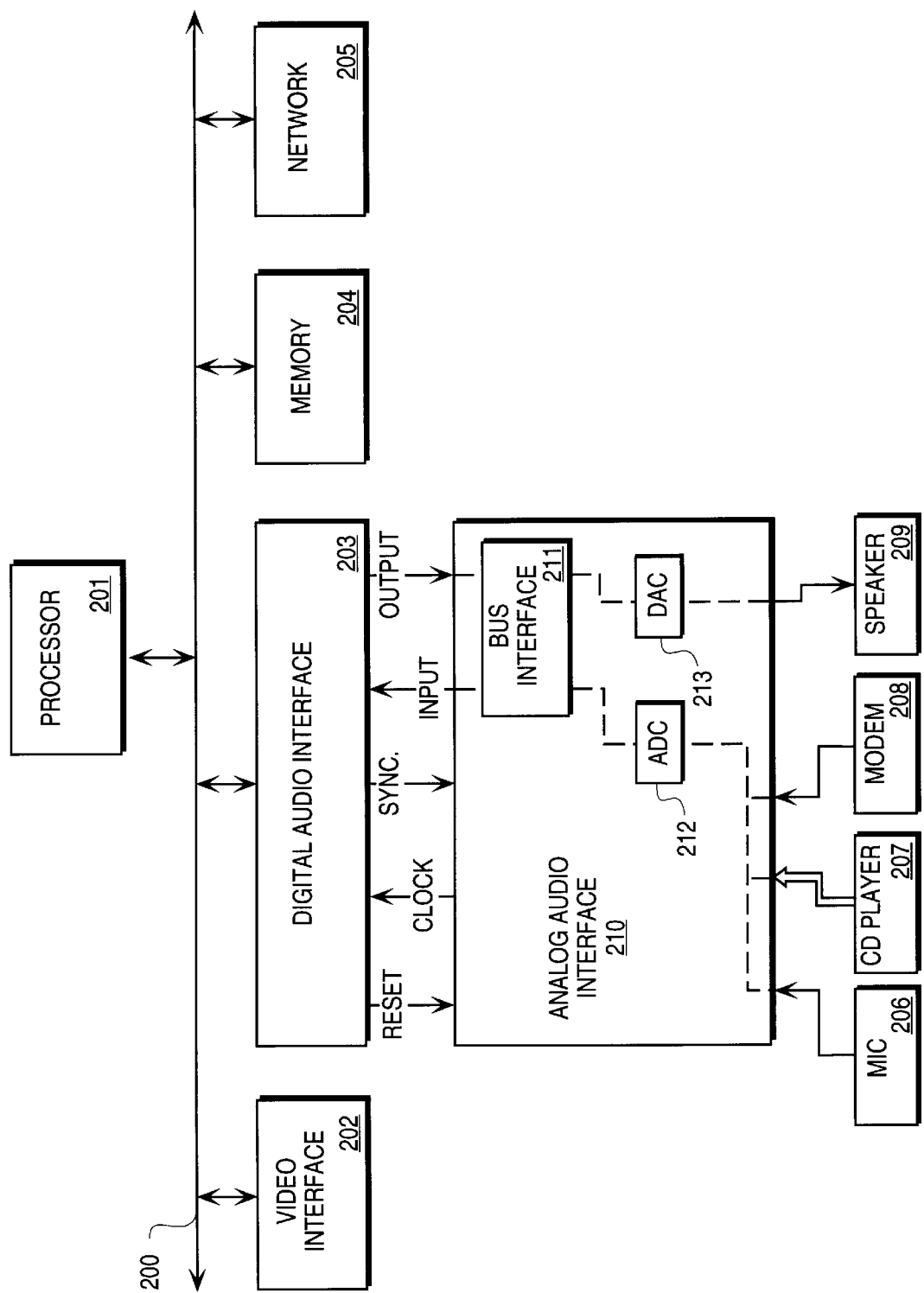
FIG. 2 is a block diagram of a computer system which shows an audio interface formed in accordance with an embodiment of the present invention.

FIG. 2 is a block diagram of a computer system which shows an audio interface formed in accordance with an embodiment of the present invention. The computer system comprises a processor 201 coupled to bus 200. Video interface 202, digital audio interface 203, memory 204, and network 205 are also coupled to bus 200 through which these peripheral devices communicate with processor 201 and with each other. Analog audio interface 210 is coupled to digital audio interface 203 by several interconnect lines including reset, clock, sync, and audio serial digital interconnect input and output lines. In addition, analog audio interface 210 is coupled to peripheral audio devices including microphone 206, compact disk (CD) player 207, modem 208, and speaker 209.

Microphone 206 collects sound waves and converts them into a corresponding voltage signal that is transmitted to the microphone input on analog audio interface 210. Analog audio interface 210 then amplifies this audio signal using a preamplifier at its microphone input to raise the voltage magnitude of the signal. The stereo output of CD player 207 is sent to stereo input jacks (separate right channel and left channel inputs) on analog audio interface 207. The output of modem 208 is similarly transmitted to an input jack on the analog audio interface, sending information received via a phone line to the computer system.

For an alternate embodiment of the present invention, the analog audio interface may comprise any number of inputs to accommodate any of a number of additional or alternate peripheral audio devices such as, for example, additional microphones, a telephone, the audio portion of a video signal, an electronic synthesizer, a sampler, or an effects device. For another embodiment, a more basic analog audio interface contains only one or two inputs, relying instead on the user to externally mix and preamplify, if necessary, all of the audio signals which the user desires to process through the computer system.

Once the audio signals are received by analog audio interface 210, they are mixed, attenuated, filtered, and/or amplified in the manner in which the user desires. In accordance with an embodiment of the present invention, all mixing is performed so as to keep the left stereo channel separated, to the desired extent, from the right stereo channel, thereby maintaining the stereophonic effect. Also, in accordance with an embodiment of the present invention, not all audio signals are mixed together. For example, it may be desirable to maintain separation of the microphone input, the CD input, and the modem input, as each may be processed differently.

Up until this point in the discussion of analog audio interface 210, audio signals are primarily analog in nature and are processed by analog circuitry within the analog audio interface. The desired mix of audio signals are then converted into digital audio signals within the analog to digital converter (ADC) block 212. In accordance with an embodiment of the present invention, the analog audio interface contains as many ADC's as there are separate signals to process. For example, in the basic system shown in FIG. 2, three ADC's are used in ADC block 212. One ADC converts from analog to digital the left channel of the stereo output of CD player 207, which may be mixed with the microphone or other audio source. A second ADC converts from analog to digital the right channel of the stereo output of CD player 207, which may also be mixed with the microphone or other audio source. A third ADC converts from analog to digital the modem output from modem 208. For an embodiment in which a user desires to maintain separation of the microphone from other audio sources, a fourth ADC converts from analog to digital the microphone output from microphone 206.

Conversion of the analog audio signal to its corresponding digital audio signal involves sampling the analog audio signal at a rate of up to approximately 48 KHz to create audio samples having a resolution of up to approximately 20 bits in length. The actual sample rate and bit length are determined according to user requirements and cost considerations. For example, for an application in which a user desires to have a voice message recorded, such as when the computer system is used as a phone answering machine, the sound quality is not important. For this application, a sample rate of 6 Khz with a resolution of 8 bits may be sufficient. The advantage to this low sample rate and small bit length is that longer messages can be stored in a given memory space. In contrast, for an application in which a user desires to control a sound system, including processing or recording high quality sound from, for example, a digital audio tape (DAT) player, a CD player, a stereo receiver, or a synthesizer, the audio signal mix is sampled at a rate of 48 KHz with 20 bit resolution for full audio frequency and dynamic range.

After the analog audio signal is converted into a digital audio signal by ADC block 212, bus interface 211 assembles the audio samples along with various status information into frames of information (described in more detail below) and sends this audio information to digital audio interface 203 via the audio serial digital interconnect input line. Upon receipt of the audio frames, digital audio interface 203 disassembles the frames to extract the audio signals and status information and, in conjunction with processor 201 along with other peripheral devices coupled to bus 200, stores or manipulates the digital audio signal according to a user's requirements. For example, a digital filter may be applied to the audio signal to provide equalization of the signal. Digital mixing, chorus, reverb, harmonization, pitch-shifting, time-shifting, room simulation, cut and paste editing, or other production effects may be applied to the audio signal as well. For another embodiment, the signal is recorded in memory 204 or transmitted across network 205. The separate audio signal from modem 208 is also processed for recreation of a faxed document or converted into an application program for execution by the computer system, depending on the information received.

Digital audio interface 203 contains all the necessary bus mastering and slave circuitry for communicating with devices coupled to bus 200 as well as control circuitry for controlling functions of analog audio interface 210. For example, digital audio interface 203 applies a RESET# signal to analog audio interface 210 via the reset interconnect line to reset the analog audio interface. The digital audio interface also contains a bus interface that assembles the processed audio samples of the digital audio signal, along with various control information, into frames of information (described in more detail below) and sends this audio information to analog audio interface 210 via the audio serial digital interconnect output line.

For one embodiment of the present invention, bus interface 211 within analog audio interface 210 contains a set of control registers which define various settings for the analog audio interface such as, for example, volume control, tone control, modem speed settings, clock disable, mixer powerdown, and other mixer and power control settings. Digital audio interface 203 sets the values stored within these control registers by sending control information, bundled with the audio samples within the information frames, to analog audio interface 210. The analog audio interface then takes this control information, stores it within the proper control register, and uses this information to control the various settings.

The proper audio signal is extracted from the frames of audio information sent along the audio serial digital interconnect output line to the analog audio interface, and bus interface 211 sends the reassembled digital audio signal to digital to analog converter (DAC) 213. The DAC converts the digital audio signal into an analog audio signal. In accordance with an embodiment of the present invention, the analog audio interface contains as many DAC's as there are separate audio signals to process. For example, in the basic system shown in FIG. 2, two DAC's are used, one for each of the left and right stereo channels.

In accordance with one embodiment of the present invention, once the audio signal is in its analog form, the signal is further processed through analog circuitry within analog audio interface 210 to adjust the final tone (bass and treble), volume, 3D stereo effects (if available), and other audio effects applied to the audio signal. The final audio signal is then sent to speaker 209 via an output jack on the analog audio interface. More appropriately, for an embodiment in which speaker 209 is a loud speaker, an external amplifier is used to couple speaker 209 to the output of the analog audio interface. Speaker 209 converts the processed audio signal into sound waves for a user to hear. In accordance with one embodiment of the present invention, the analog audio interface may comprise any number of outputs to accommodate any of a number of additional or alternate peripheral audio devices such as, for example, additional speakers or headphones to create a stereo or surround-sound effect, a DAT for recording the audio output, another electronic recording device, or an effects unit. For one embodiment of the present invention, the analog audio interface includes a modem output jack which is coupled to the input of the modem for sending information from the computer system across a phone line.

The audio serial digital interconnect input and output lines which couple analog audio interface 210 to digital audio interface 203 allow the analog and digital architecture of an audio interface to be split. The digital audio interface 203 comprises primarily digital circuitry. The analog audio interface 210 comprises primarily analog circuitry and is coupled to the digital circuitry of the digital audio interface by the reset, clock, sync, and audio serial digital interconnect input and output lines as shown. In this manner, the analog audio interface can be specially manufactured using a fabrication process suited for low-noise analog circuitry at relatively low cost, and the digital audio interface can be specially manufactured using a fabrication process suited for fast, high density digital circuitry at relatively low cost. Ultimately, the sound quality and economics of the audio interface are improved.

Figure 3:
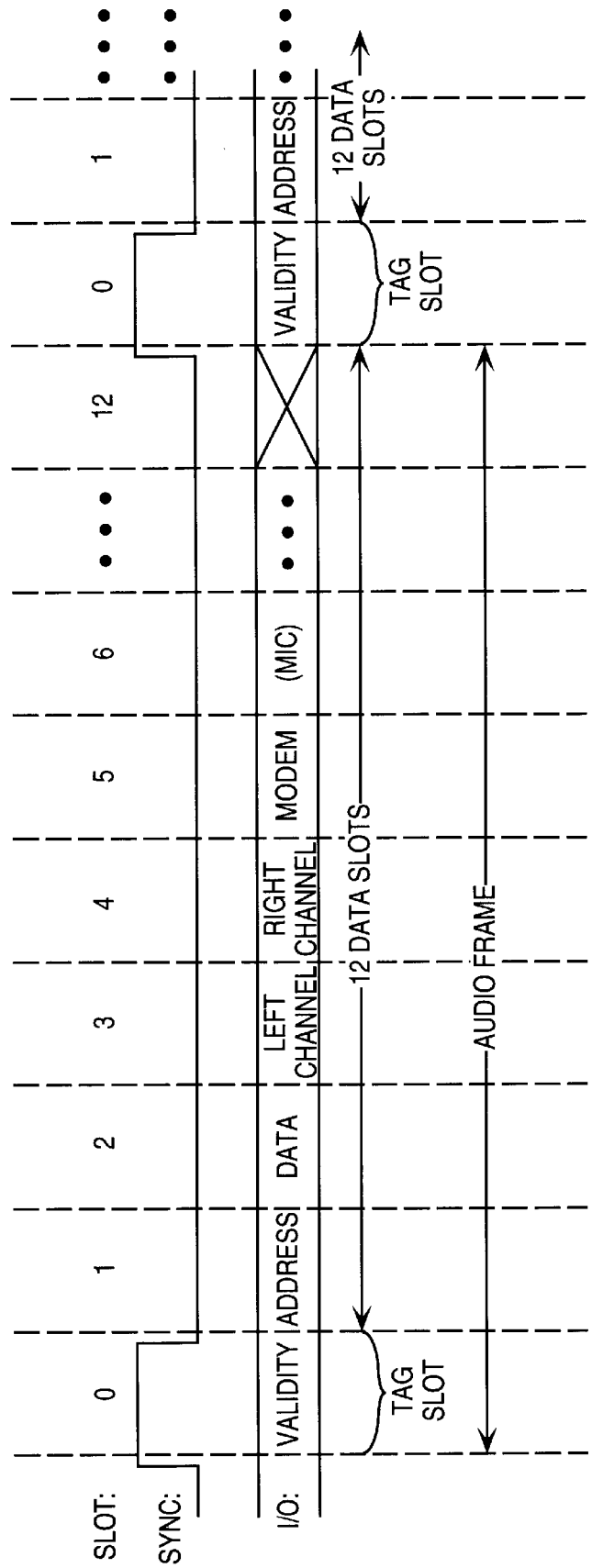
FIG. 3 is a timing diagram which shows an audio frame and I/O data slots defined in accordance with an embodiment of the present invention.

FIG. 3 is a timing diagram that shows a frame of information in accordance with one embodiment of the present invention. As shown, the input/output (I/O) audio frame is divided into 13 time slots numbered 0 through 12. A time slot, or "slot," is simply a portion of the audio frame bit stream where a particular piece of information resides. The Sync signal is sent from the digital audio interface to the analog audio interface to indicate the beginning of an audio frame transmitted between the digital and analog audio interfaces. An audio frame is then transmitted from either the analog audio interface to the digital audio interface or from the digital audio interface to the analog audio interface across the audio serial digital interconnect input or output lines respectively.

The first slot, Slot 0, in the audio frame is called the tag slot, and the following 12 slots are called data slots. The tag slot contains tag bits that indicate the validity (valid or invalid) of data contained within a corresponding one of the data slots. For example, for one embodiment, when a data slot contains invalid data, its associated tag bit is set to a logical "0". When a data slot contains valid data, its associated tag bit is set to a logical "1".

The next slot, data slot 1, in the audio frame contains an address for a register within the set of control registers in the analog audio interface. The contents of data slot 2 depends on whether the I/O audio frame is an output frame (sent from the digital audio interface to the analog audio interface) or an input frame (sent from the analog audio interface to the digital audio interface). If the audio frame is an output frame and the digital audio interface is writing data into the set of control registers in the analog audio interface, then data slot 2 contains the data to be written into the register address identified in data slot 1. If the audio frame is an input frame, and the analog audio interface is responding to a read command from the digital audio interface, then data slot 2 contains the data stored in the register address identified in data slot 1. In accordance with one embodiment of the present invention, data slot 2 is filled with "0"s for all other cases.

Data slot 3 in the audio frame contains a single audio sample (e.g. a pulse code modulated sample) of the left stereo channel of the audio signal being sent across the audio serial digital interconnect. Data slot 4 in the audio frame contains a single audio sample of the right stereo channel of the audio signal being sent across the audio serial digital interconnect. Data slot 5 contains modem I/O data. For an input audio frame being sent from the analog audio interface to the digital audio interface, data slot 6 contains a single audio sample of the audio signal received from a microphone coupled to the analog audio interface. The remaining data slots 7–12 are currently undefined and, in accordance with one embodiment of the present invention, are filled with O's. For an alternate embodiment of the present invention, data slots 7–12 may be used to transmit other types of information, such as, for example, rear left channel and rear right channel audio signal samples in a surround-sound system, or control and status information of peripheral audio devices.

As can be seen in FIG. 3, as the final data slot of the audio frame is sent, the Sync signal again goes high, signaling the beginning of another audio frame. By sending a series of frames of information, each containing the appropriate information in the proper slots, the receiving IC can reassemble the series of left and right channel audio signal samples from successive audio frames, thereby recreating the original audio signal sent via the audio frames. Also, control data and other audio information can be sent in addition to the audio signal samples in alternate data slots via the audio frames. In accordance with an alternate embodiment of the present invention, the time slots contain different types of data than what is defined above, and there may be more or less slots which are rearranged or sized differently, but the basic structure of sending a tag slot separately from the data slots to which the tag slot corresponds is maintained.

Figure 4:
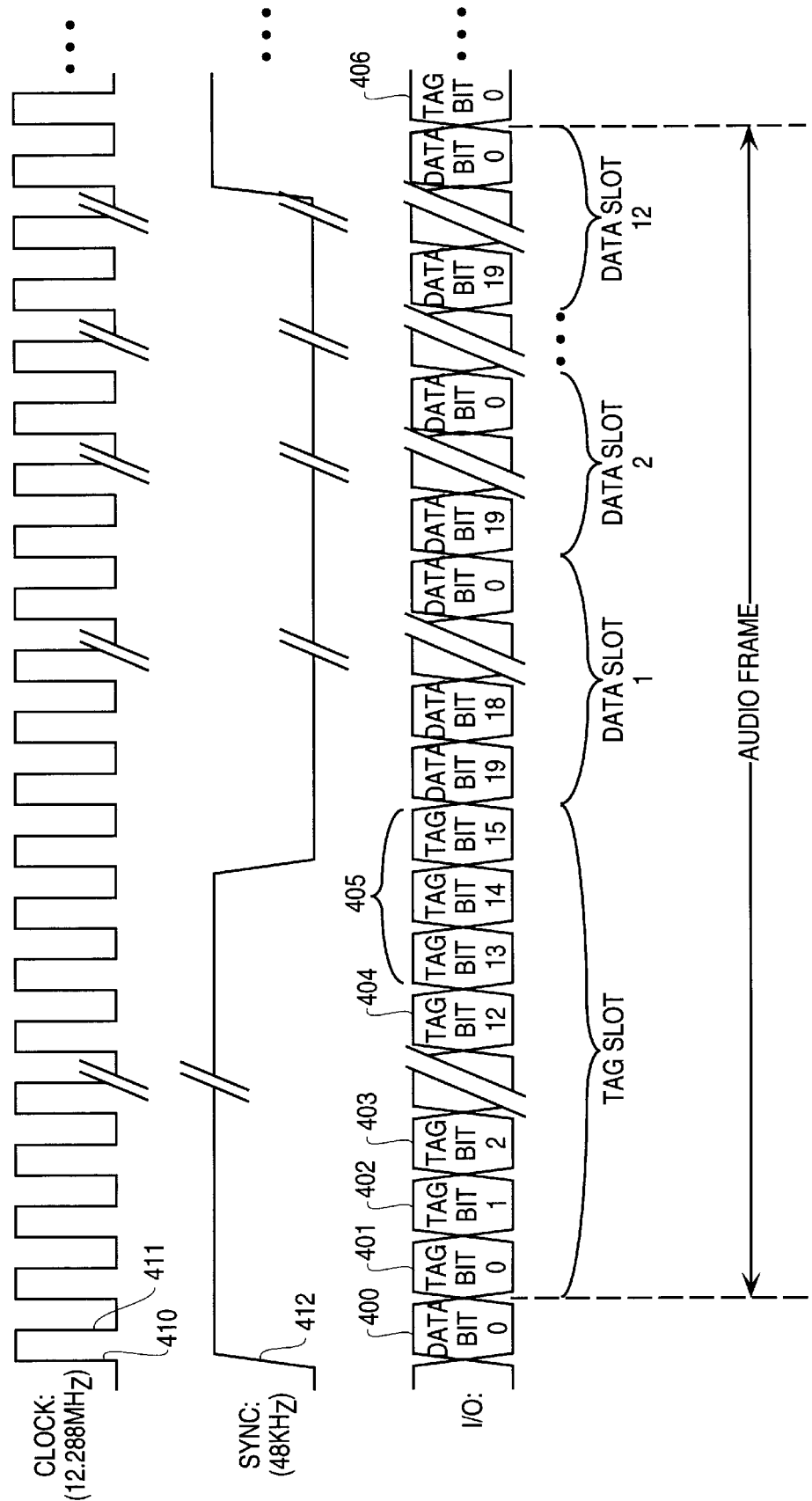
FIG. 4 is a more detailed timing diagram showing an audio frame and I/O bits defined in accordance with an embodiment of the present invention.

FIG. 4 is a more detailed timing diagram showing an audio frame sent across the audio serial digital interconnect, and the individual I/O bits for the audio frame time slots described above. The 12.288 MHz Clock signal generated by the analog audio interface and transmitted to the digital audio interface is also shown, as is the 48 KHz Sync signal. The cycle begins with the assertion of the Sync signal by the digital audio interface. Sync is asserted such that its rising edge 412 is synchronous with the rising edge of Clock, 410. At the immediately following falling edge of Clock, 411, the analog audio interface recognizes the assertion of Sync and prepares for either sending or receiving the next audio frame, depending on whether the frame is an input or output frame, respectively. During this time, the final bit, 400, of the previous audio frame, data bit 0 of data slot 12, is being sent. In general, all signal transitions are synchronized to the rising edge of the clock signal, while the signals are read by the receiving device on the falling edge of the clock signal to ensure that both input and output audio frames are time aligned.

The first bit 401 of the tag slot in the audio frame is referred to as tag bit 0. Tag bit 0 is a global bit which flags the validity for the entire audio frame. For one embodiment, if this first tag bit is a "1", this indicates that the current audio frame contains at least one slot of valid data. In general, it is to be appreciated that for all signal values offered herein in conjunction with a particular embodiment of the present invention, the signal value may be reversed for an alternate embodiment of the present invention. So, for example, for an alternate embodiment of the present invention, a value of "0" for tag bit 0 indicates that the current audio frame contains at least one slot of valid data.

The next 12 tag bit positions, tag bits 1–12, indicate which of the corresponding 12 data slots contain valid data. For one embodiment of the present invention, when a tag bit contains a value of "1", the corresponding data slot contains valid data. For example, the next tag bit position 402, tag bit 1, corresponds to data slot 1 which, as discussed above, contains the address of a register within the control register set of the analog audio interface. For a tag bit 1 value of "0", the address contained within data slot 1 is invalid. In accordance with one embodiment of the present invention, all invalid data slots are filled with "0"s. So in this example, data slot 1, the address data slot, contains all "0"s.

Similarly, the next bit position, 403, tag bit 2, indicates whether or not data slot 2 contains valid data, and so on, until tag bit 12 is reached, 404, which indicates whether or not its corresponding data slot, data slot 12, contains valid data. In this manner, audio signals of differing sample rates can be transmitted across the audio serial digital interconnect at the fixed 48 KHz rate. For example, for one embodiment of the present invention, data slot 3, the left channel audio signal sample, contains valid audio signal samples sampled at 48 KHz for each of the audio frames transmitted at 48 KHz. Data slot 6, the microphone audio signal sample, however, contains samples sampled at 12 KHz, so only every fourth audio frame transmitted at 48 KHz contains valid microphone audio signal samples. The tag bits 3 and 6 which indicate the validity of corresponding data slots 3 and 6, respectively, reflect this difference in sample rates in that tag bit 3 is "1" for every audio frame, and tag bit 6 is "1" every fourth audio frame, and "0" otherwise.

The tag slot is 16 bits wide, tag bits 0–15, wherein, as stated above, tag bit 0 is a global validity bit for the entire audio frame, and each of tag bits 1–12 are validity bits for each of data slots 1–12 respectively. The final 3 tag bits 405, tag bits 13–15, are currently undefined and, for one embodiment of the present invention, are simply filled with "0"s. For an alternate embodiment of the audio serial digital interconnect, these three tag bits of the audio frame may be used to, for example, identify a particular analog audio interface for an embodiment in which multiple analog audio interfaces are coupled to a single digital audio interface.

After the tag slot portion of the audio frame is sent, the 12 data slots follow. Each data slot is 20 bits wide, comprising data bits 19–0. As stated above in conjunction with FIG. 3, the first data slot, data slot 1, if valid, contains the address for a register within the set of control registers of the analog audio interface. The first data bit sent in an output audio frame, data bit of data slot 1, indicates whether the digital audio interface is requesting a read or write operation to the set of control registers. For example, for one embodiment, when data bit 19 of data slot 1 is a "1", the digital audio interface is requesting a read operation, and when the bit is a "0", a write is being requested. If the audio frame is an input frame (coming from the analog audio interface to the digital audio interface), then data bit 19 of data slot 1 is "0".

The remaining bits of data slot 1 determine the actual address of the desired control register for the read or write operation of an output audio frame, and echo the address of the desired control register in response to a read operation when the audio frame is an input frame. The most significant bit of the address is left-justified beginning with data bit position 18, so that if the address is less than 19 bits long, all trailing data bits within data slot 1 are set to "0". For example, in accordance with one embodiment of the present invention there are 128 register locations in the set of control registers in the analog audio interface. For this embodiment, only 7 bits are necessary to uniquely identify all 128 registers, so data bits 18–12 of data slot 1 contain this 7 bit address, and remaining data bits 11–0 are set to "0".

Next, data slot 2 of the audio frame is sent via the audio serial digital interconnect. For an output frame in which a write operation is indicated (e.g. data bit 19 of data slot 1 is "0" for the embodiment described above), data slot 2 contains the data to be written into the control register address identified in data slot 1. For an input frame that is responding to a read request from the digital audio interface, data slot 2 contains the data read from the desired control register. The data contained in data slot 2 is left-justified with the most significant bit position being data bit 19. For one embodiment of the present invention, each register in the set of control registers in the analog audio interface is 16 bits (one word) long. For this embodiment, only the first 16 bits of data slot 2, data bits 19–4, contain the control register data. For an alternate embodiment, the control registers are anywhere from, for example, one byte up to 20 bits long, and the desired register contents are contained within data slot 2, left-justified with trailing "0"s.

The remaining, defined data slots of the audio frame, data slots 3–6, contain left-justified audio signal samples with the most significant bit position being data bit 19 for each data slot. Therefore, for an embodiment in which, for example, the resolution of both the left and right channel audio samples are 20 bits, the 20 data bits of slots 3 and 4 will contain the left and right channel samples respectively. However, for an embodiment in which the resolution of the samples are only 16 bits, then data bits 19–4 of data slots 3 and 4 will contain the 16 bit left and right channel samples, respectively, for the current audio frame, followed by the remaining data bits 3–0 of data slots 3 and 4 filled with "0"s. For another embodiment in which the microphone signal is sampled at a resolution of, for example, only 8 bits, data bits 19–12 of data slot 6 will contain the 8 bit sample for the current audio frame with all of the trailing data bit positions 11–0 filled with "0"s.

In this manner, audio samples of any length up to 20 bits can be sent in an audio frame data slot. Trailing bit positions of data slots which are undefined are filled with "0"s. In addition, for an invalid data slot (having its corresponding tag bit set to "0" in the tag slot, as described above), all data bit positions are filled with "0"s.

When the final data bit, data bit 0, of the final data slot, data slot 12, of the current audio frame is sent, the Sync signal again goes high to indicate the initiation of another audio frame. The next audio frame is then sent immediately after the conclusion of the final data bit of the final data slot of the current audio frame. Tag bit 0, 406, is the start of the next audio frame.

Audio frames are sent at a rate of 48 KHz, meaning each audio frame lasts a total of approximately 20.833 microseconds. Using the audio serial digital interconnect at this rate, and packing data slots in the audio frames to their fullest capacity, the present method can support multiple digital audio signal transfers at sample rates of up to 48 KHz with 20 bit resolution, thereby sufficiently covering the entire audio frequency spectrum of 20 Hz to 20 KHz, with full dynamic range.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for communicating between two integrated circuits (IC's), the method comprising the steps of:

sending a sync signal between a first IC and a second IC, the sync signal indicating the beginning of the transmission of a frame of information between the first IC and the second IC;

sending the frame of information between the first IC and the second IC, the frame of information comprising a tag slot preceding a plurality of data slots, wherein the tag slot comprises a plurality of tag bits, each of the tag bits indicating validity of data contained within a corresponding one of the plurality of data slots.

2. The method of claim 1, wherein the frame of information contains audio signals.

3. The method of claim 1, wherein the second IC contains a digital to analog converter and is coupled to a speaker.

4. The method of claim 1, wherein the second IC contains an analog to digital converter and is coupled to a microphone.

5. The method of claim 1, wherein a first tag bit indicates validity of the frame of information.

6. The method of claim 1, wherein the tag slot comprises 12 contiguous tag bits, each of the 12 contiguous tag bits indicating validity of data contained within a corresponding one of 12 contiguous data slots.

7. The method of claim 6, wherein a first data slot contains an address for a register contained within one of the first or second IC's, and a second data slot contains data to be stored in the register.

8. The method of claim 7, wherein a third data slot contains one of a left stereo channel or right stereo channel audio sample, and a fourth data slot contains the other of the left stereo channel or right stereo channel audio sample.

9. The method of claim 2, wherein each of the plurality of data slots is 20 bits long.

10. The method of claim 9, wherein the sync signal has a frequency of approximately 48 Khz, the tag slot is 16 bits long, and the frame of information comprises a total of 12 data slots.

11. A method for communicating information between two integrated circuits (IC's), the method comprising the steps of:

sending a first plurality of frames of information from a first IC to a second IC, each of the first plurality of frames of information comprising a tag slot preceding a plurality of data slots, wherein the tag slot comprises a plurality of tag bits, each tag bit indicating the validity of data contained within a corresponding one of the plurality of data slots; and sending a second plurality of frames of information from the second IC to the first IC, each of the second plurality of frames of information comprising a tag slot preceding a plurality of data slots, wherein the tag slot comprises a plurality of tag bits, each tag bit indicating the validity of data contained within a corresponding one of the plurality of data slots.

12. The method of claim 11, wherein the second IC contains a digital to analog converter having an input and an output, the input receiving data from data slots of the first plurality of frames of information, the output being coupled to a speaker.

13. The method of claim 11, wherein the second IC contains an analog to digital converter having an input and an output, the output sending data to data slots of the second plurality of frames of information, the input being coupled to a microphone.

14. The method of claim 11, wherein a first tag bit indicates validity of its associated frame of information.

15. The method of claim 11, wherein for each frame of information, its tag slot comprises 12 contiguous tag bits, each of the 12 contiguous tag bits indicating validity of data contained within a corresponding one of 12 contiguous data slots.

16. The method of claim 15, wherein for each frame of information, its first data slot contains a register address for a register contained within one of the first or second IC's, and its second data slot contains data to be stored in the register.

17. The method of claim 16, wherein for each frame of information, its third data slot contains one of a left stereo channel or right stereo channel audio sample, and its fourth data slot contains the other of the left stereo channel or right stereo channel audio sample.

18. The method of claim 11, wherein each data slot is 20 bits long.

19. The method of claim 18, wherein the first and second pluralities of frames of information are sent at a rate of 48 Khz.

20. The method of claim 1, wherein a first tag bit of the plurality of tag bits is a global validity bit for the frame of information.

21. The method of claim 11, wherein a first tag bit of the plurality of tag bits is a global validity bit for the first and second plurality of frames.

* * * * *